Dec. 19, 1933.   J. O. FINK   1,939,888
CLUTCH
Filed March 16, 1931
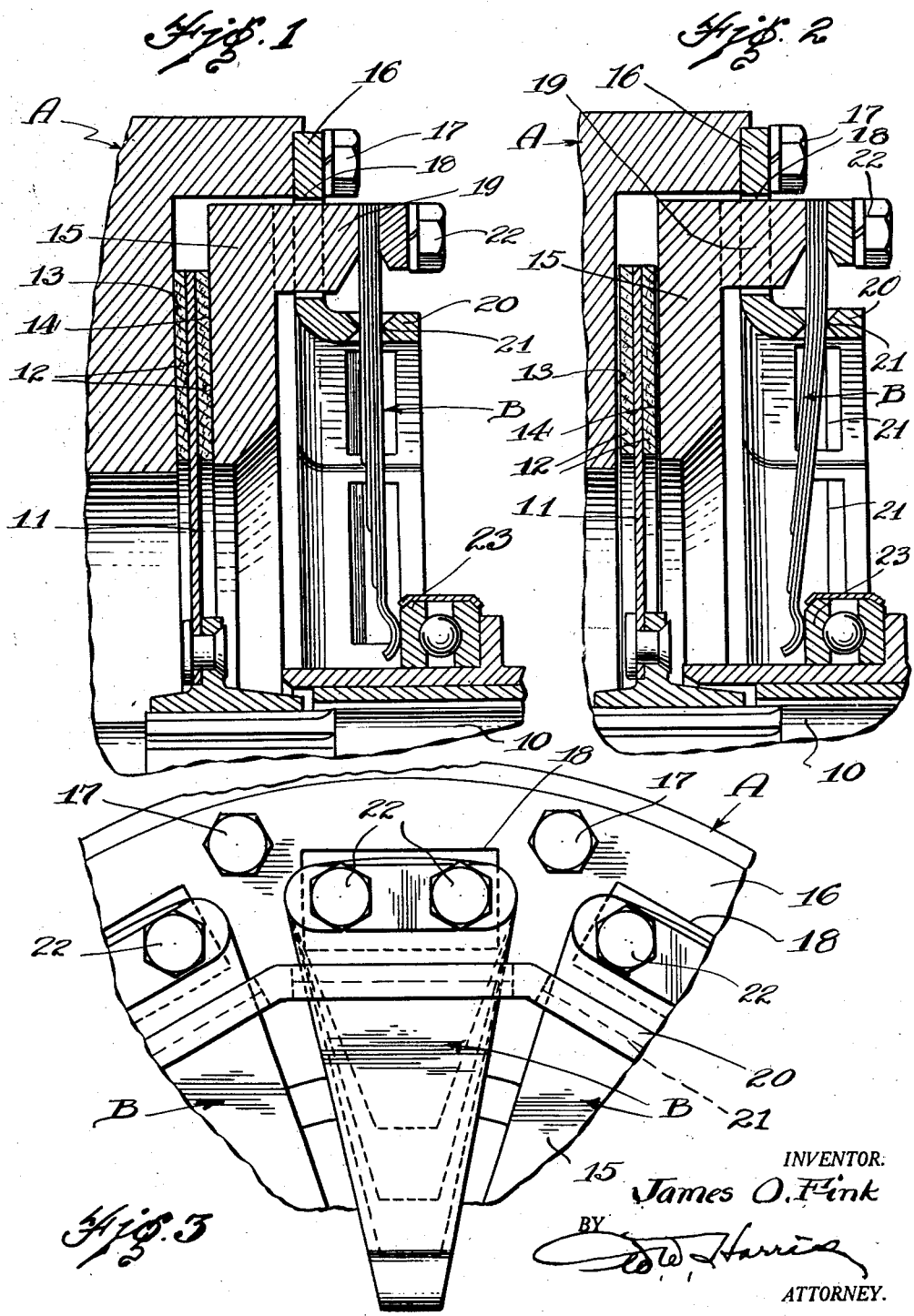
INVENTOR:
James O. Fink
BY
ATTORNEY.

Patented Dec. 19, 1933

1,939,888

UNITED STATES PATENT OFFICE 1,939,888

CLUTCH

James O. Fink, Detroit, Mich., assignor to Continental Motors Corporation, Detroit, Mich., a corporation of Virginia Application March 16, 1931. Serial No. 522,891

16 Claims. (Cl. 192—68)

My invention relates to clutches and more particularly to clutches of the type adapted for use with motor vehicles and the like.

One of the primary objects of those connected with the manufacture of clutches is to simplify the clutch construction and still retain the smoothness of operation necessary in clutches adapted for employment with motor vehicles.

One of the objects of my invention is to construct a clutch having generally improved characteristics but which is constructed of a minimum number of elements in order to provide a product that may be economically manufactured and readily maintained in service with a minimum of cost.

A further object of my invention resides in the provision of a clutching mechanism having a smooth engagement, free from grabbing or chattering tendencies.

Primarily it is my purpose to provide a clutch mechanism adapted for operative association with a clutch driven element or disc presenting a full face contact with the driving element at the time of initial engagement, although it will be understood that my clutch construction may be used in combination with other types of clutch discs as commonly employed in the conventional type of clutches, if so desired.

For a more detailed understanding of my invention, reference may be had to the accompanying drawing which illustrates one form which my invention may assume, and in which:

Figure 1 is a fragmentary longitudinal sectional view through a clutch and associated elements showing the parts in clutching relation, Figure 2 is a similar sectional view showing the parts in declutching relation, and Figure 3 is a rear elevational view of the clutch.

As shown in the drawing illustrating a preferred embodiment of my invention, my improved clutch is illustrated in combination with a driving means such as the engine flywheel A. In general the driving means or flywheel A is associated with a driven means or shaft 10, said shaft having a clutch element such as a clutch disc 11 secured thereto in the usual manner and provided with mats 12 which are adapted for frictional engagement with the machined face 13 of the flywheel and the driving face 14 of a driving member or pressure plate 15. This pressure plate is operatively connected with the flywheel and driven thereby.

In the present embodiment of my invention I have illustrated a back plate 16 secured to the flywheel by means of bolts or other fastening devices 17, this back-plate provided with a plurality of openings 18 through which a plurality of driving lugs 19 may be projected, these driving lugs being projected rearwardly of the pressure plate 15 and preferably integrally carried thereby. The back plate is provided with a rearwardly projecting flange 20 at the inner edge of the ring-like back plate member, this flange being constructed to provide a plurality of fulcruming means 21 for purposes which will be hereinafter described.

It will be noted that I have provided relatively movable driving and driven clutch elements associated with the driving and driven means, these elements preferably consisting of the clutch disc and pressure plate. In order to load one of these clutch elements and preferably the pressure plate 15 I have provided spring devices or means B formed preferably of a plurality of layers of spring steel elements capable of sliding on each other. I have preferably provided a plurality of such spring means which are disposed radially about the driven means of the clutch, although it will be understood that any suitable type of spring means may be employed which may take the form of a spring disc or other device if so desired. However, to provide the flexibility and to permit the clutch to be easily actuated this spring means is preferably constructed of a plurality of spring levers which are adapted to be each secured or otherwise fixed to the pressure plate at a plurality of angularly spaced points. These spring means which preferably consist of laminated structures are each rigidly clamped or anchored rigidly to the pressure plate and are preferably secured to the driving lugs 19 by means of the bolts or other suitable fastening devices 22. Thus it will be noted that the outer ends of each of these spring means are rigidly secured to the pressure plate and arranged to extend radially inwardly towards the driven member of the clutch. These spring means are each fulcrumed to the back plate and therefore with the flywheel on the fulcruming means 21 and the said spring means are so constructed as to be given an initial set so that when the same is located or positioned as shown in Figure 1 the spring means load the pressure plate and effect the clutching action between the clutch disc and associated driving devices.

The inner ends of the spring means are engaged by a clutch collar 23 of usual construction which is actuated by means of a clutch pedal (not shown) and moved to actuate the spring means and to cause the same to assume the position as shown in Figure 2 in declutching, Figure 2 showing the parts in fully disengaged relation. As the pressure on the clutch pedal is released the collar or actuator 23 is retracted and the inherent resiliency of the spring means forces the pressure plate into engagement with the clutch disc to clamp the same in driving relation between the machined face 13 of the flywheel and the driving face 14 of the pressure plate 15. The laminated devices B preferably have their layers of different lengths radially, as shown in Figs. 1 and 2, to impart flexibility to their inner ends and stiffness to their outer ends.

It will be noted that the spring means will effect a very gradual and smooth engagement of the clutch elements even though the driven element or disc presents a full face contact with the pressure plate at the time of initial clutch engagement. It will be noted that as the pressure plate is moved from the position shown in Figure 2 to that shown in Figure 1 the same will be moved first into initial contact with the clutch disc with little or no pressure, but as the spring means flattens out the load is progressively uniformly increased until the full load is applied to the pressure plate for effecting a clutching action.

It will be further noted that the construction described above is very simple, can be readily and economically manufactured, may be readily assembled with a minimum of time and labor and produces a clutch construction which will not chatter or grab in operation and which is subjected to a minimum of wear due to the fact that the cooperating clutch elements are in full face contact on initial clutching engagement thereby providing a clutch having a long life and which requires a minimum of adjustment while in operation.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In a clutch, driving and driven means including relatively movable driving and driven elements for clutching and de-clutching action, a back plate secured to said driving means and provided with an opening, said driving element having a portion projected through said opening in the back plate to operatively connect same in driving relation, and spring means secured to said driving element and fulcrumed on said back plate, said spring means adapted to load said driving element.

2. In a clutch, driving and driven means including relatively movable driving and driven elements for clutching and de-clutching action, a back plate secured to said driving means and provided with an opening, said driving element having a driving lug projecting through said opening in the back plate to operatively connect same in driving relation, and a plurality of spring means secured to said driving element and extending radially inwardly, said back plate provided with fulcrum means adapted for engagement with said spring means, said spring means adapted to load said driving element.

3. In a clutch, driving and driven means including relatively movable driving and driven elements for clutching and de-clutching action, a back plate secured to said driving means and provided with an opening, said driving element having a driving lug projecting through said opening in the back plate to operatively connect same in driving relation, spring means having one end clamped to said driving lug, and fulcrum means carried by said back plate and adapted for fulcruming engagement with an intermediate portion of said spring means, said spring means adapted to load said driving element.

4. In a clutch having a driving flywheel and driven shaft, a disc assembly secured to the shaft, a pressure plate driven with the flywheel and engageable with the disc assembly for clutching action between the flywheel and shaft, a flexible device extending radially of the shaft, said device having an outer portion rigidly anchored to the pressure plate and an inner portion adjacent said shaft, said device having an intermediate portion fulcrumed with the flywheel and adapted to move the pressure plate toward the disc assembly, and means slidable axially of said shaft for flexing the inner portion of said device to de-clutch the pressure plate.

5. In a clutch having a driving flywheel and driven shaft, a disc assembly secured to the shaft, a pressure plate driven with the flywheel and engageable with the disc assembly for clutching action between the flywheel and shaft, a flexible device extending radially of the shaft, said device having an outer portion rigidly anchored to the pressure plate and an inner portion adjacent said shaft, said device having an intermediate portion fulcrumed with the flywheel and adapted to move the pressure plate toward the disc assembly, and means slidable axially of said shaft for flexing the inner portion of said device to de-clutch the pressure plate, said device comprising a plurality of flat contacting springs.

6. In a clutch having a driving flywheel and driven shaft, a disc assembly secured to the shaft, a pressure plate driven with the flywheel and engageable with the disc assembly for clutching action between the flywheel and shaft, a flexible device extending radially of the shaft, said device having an outer portion rigidly anchored to the pressure plate and an inner portion adjacent said shaft, said device having an intermediate portion fulcrumed with the flywheel and adapted to move the pressure plate toward the disc assembly, and means slidable axially of said shaft for flexing the inner portion of said device to de-clutch the pressure plate, said device comprising a plurality of flat contacting springs, one of which is radially longer than another to impart flexibility to said device at said inner portion thereof.

7. In a clutch, driving means, a pressure plate driven with said driving means, driven means, a disc driven with said driven means, a yielding member anchored with the pressure plate for loading the pressure plate, and means acting on the yielding member for transmitting motion therethrough to unload the pressure plate.

8. In a clutch, driving and driven members, a clutch element secured to the driven member and engageable with the driving member, a pressure plate driven with the driving member and movable axially of the driven member for engagement with the clutch element, a yielding device anchored to and driven with the pressure plate and yieldingly effecting clutching engagement of the pressure plate and clutch element, and means engageable with said yielding device for de-clutching said pressure plate and clutch element.

9. In a clutch, driving means, driven means, said driving and driven means including relatively movable elements for clutching and de-clutching action, a yielding device clamped for loading one of said elements and anchored thereto for clutching action, and means acting on said device for moving one of said elements to an unloading position for de-clutching action.

10. In a clutch, driving means, driven means, said driving and driven means including relatively movable elements for clutching and de-clutching action, a spring secured to one of said elements, means carried by the driving means engaging said spring for producing a load on the element secured thereto for clutching action, and means acting on said spring for moving said element secured thereto for de-clutching action.

11. In a clutch, driving means, driven means, said driving and driven means including relatively movable elements for clutching and de-clutching action and a spring secured at its outer end thereof to one of said elements and having an intermediate portion thereof fulcrumed with the driving means for loading the element secured thereto, the inner end of said spring extending for flexing toward said driven means.

12. In a clutch, driving means, driven means, said driving and driven means including relatively movable elements for clutching and de-clutching action and a laminated spring secured at its outer end thereof to one of said elements and having an intermediate portion thereof fulcrumed with the driving means for loading the element secured thereto, the inner end of said spring extending for flexing toward said driven means and means slidable axially of the driven means for moving the said inner end of said laminated spring to unload the element secured thereto.

13. In a clutch, a driving flywheel, a driving pressure plate, a driven shaft, a driven disc structure, a lever clamped to the pressure plate at its outer end and having an intermediate portion fulcrumed with the flywheel.

14. In a clutch, a driving flywheel, a driving pressure plate, a driven shaft, a driven disc structure, a lever clamped to the pressure plate at its outer end and having an intermediate portion fulcrumed with the flywheel, said lever being loaded by said fulcrum to effect the clutching action.

15. In a clutch, a driving flywheel, a driving pressure plate, a driven shaft, a driven disc structure, a yielding lever extending substantially radially of said shaft and having its outer end clamped to the pressure plate, said yielding lever having an intermediate portion fulcrumed with the flywheel, and means for actuating the inner end of the lever for de-clutching.

16. In a clutch, a driving flywheel, a driving pressure plate, a driven shaft, a driven disc structure, a yielding lever extending substantially radially of said shaft and having its outer end clamped to the pressure plate, said yielding lever having an intermediate portion fulcrumed with the flywheel, and means for actuating the inner end of the lever for de-clutching, said fulcrum initially stressing said yielding lever to effect clutching.

JAMES O. FINK.